UNITED STATES PATENT OFFICE.

ROSCOE P. MASE, OF WILKINSBURG, PENNSYLVANIA, ASSIGNOR TO MINE SAFETY APPLIANCES COMPANY, OF PITTSBURGH, PENNSYLVANIA, A CORPORATION OF PENNSYLVANIA.

GAS-PURIFYING COMPOSITION AND METHOD OF MANUFACTURING SAME.

1,396,586. Specification of Letters Patent. Patented Nov. 8, 1921.

No Drawing. Application filed June 5, 1920. Serial No. 386,814.

*To all whom it may concern:*

Be it known that I, ROSCOE P. MASE, a resident of Wilkinsburg, in the county of Allegheny and State of Pennsylvania, have invented a new and useful Improvement in Gas-Purifying Compositions and Methods of Manufacturing the Same, of which the following is a specification.

The object of the invention is to provide a gas-purifying composition which has a large capacity for removing moisture and other vapors and gases, such as acid-reacting gases from a mixture of gases or vapors or both, such for example as air, and also to provide a process of manufacturing the composition.

The composition comprises a carrier, such as granular pumice stone intimately combined with an alkali while the latter is maintained at an elevated temperature. While any suitable alkali may be used, such for example as caustic potash, caustic soda is preferably used.

In manufacturing the composition, various proportions of pumice stone and alkali may be used, although it has been found that two-thirds by weight of alkali and one-third by weight of pumice stone produce very satisfactory results, and such proportions are preferably used. The pumice stone is crushed and meshed to the desired size, which, for most purposes, may be such as will pass through an eight mesh screen and stay on a fourteen mesh screen.

The alkali, preferably caustic soda, is heated to approximately 50° C. above its melting point, which is about 310° C., and the granular pumice is slowly fed into the melted alkali while the latter is agitated, as by stirring, the vessel or container being continuously heated. It has been found that a violent action and evolution of gas takes place while the pumice is being stirred into the alkali until the mass becomes quite viscous, which occurs rather suddenly when about two-thirds of the pumice has been introduced. The occurence of such violent action indicates that a chemical reaction takes place. Whether a chemical reaction occurs, or whether the violent action is a result of a deep absorption of the alkali by the pumice, it has been found that the alkali is intimately combined with the body of the pumice as distinguished from a surface coating thereof. Other carriers may be used which evolve gas while being combined with an alkali in the manner explained.

After the viscous point has been reached, as stated above, the remainder of the pumice is fed in quickly under vigorous stirring, and thereafter the heating of the vessel is discontinued. As the composition cools it is vigorously stirred, with the result that it breaks up into granules of about the same size or mesh as that of the original pumice introduced. The material is then packed in air-tight containers before it cools below a temperature of about 100° C.

It has been found that the gas-purifying composition thus described very effectively removes moisture from air or other gases, and that in doing so it holds its form for a long period of time, and that at no stage does it become slushy or soft as is characteristic of some forms of gas-purifying or dehydrating material. To assist in preventing the plugging of the interstices between the granules when the composition is used for the absorption of moisture, variable proportions of finely divided charcoal may be mixed with the alkali before the addition of pumice thereto.

The composition may advantageously be used for removing acid reacting gases, such as chlorin, carbon-dioxid, etc., from a mixture of gases, the acid, reacting gas combining with the sodium element of the sodium hydroxid and forming a salt and water.

Structurally, the composition is exceptionally hard and porous permitting the passage of gases through the interstices between the granules with a minimum resistance. Furthermore, due to the structure of each granule, an extra large amount of caustic soda or other alkali is exposed to the action of gases or vapors to be removed from the gases being treated.

The composition may, for example, be used in laboratory separation of gases and vapors, and in apparatus for the purification of air in closed places, such as submerged submarines, and in breathing apparatus, gas masks and the like, in all of which uses it has the characteristics and advantage previously explained.

I claim:—

1. A gas-purifying composition, comprising pumice intimately combined with an alkali.

2. A gas-purifying composition, comprising pumice intimately combined with caustic soda.

3. A gas-purifying composition, comprising granular pumice combined with an alkali at a temperature above the melting point of the alkali.

4. A gas-purifying composition, comprising granular pumice combined with an alkali at a temperature above the melting point of the alkali, the alkali being by weight about twice that of the pumice.

5. The process of manufacturing a gas-purifying composition, which consists in heating caustic soda to a temperature above its melting point and in feeding granular pumice into the heated caustic soda while agitating the latter.

6. The process of manufacturing a gas-purifying composition, which consists in heating two parts by weight of caustic soda to a temperature above its melting point, feeding one part by weight of granular pumice into the heated caustic soda while the latter is agitated and until the combined caustic soda and pumice becomes viscous, and then placing the remainder of the pumice into the mixture and agitating the mixture until it becomes granular.

In testimony whereof, I have hereunto set my hand.

ROSCOE P. MASE.

Witnesses:
G. H. BURRELL,
J. LEE BARNES.